United States Patent
Harthattu et al.

(10) Patent No.: US 10,111,093 B2
(45) Date of Patent: Oct. 23, 2018

(54) MOBILE DEVICE TO PROVIDE CONTINUOUS AND DISCRETE USER AUTHENTICATION

(71) Applicant: QUALCOMM Incorporated, San Diego, CA (US)

(72) Inventors: Ashwath Harthattu, San Diego, CA (US); Steven Douglas Laver, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 14/593,432

(22) Filed: Jan. 9, 2015

(65) Prior Publication Data

US 2016/0205094 A1    Jul. 14, 2016

(51) Int. Cl.
| | |
|---|---|
| H04W 12/06 | (2009.01) |
| H04W 4/02 | (2018.01) |
| H04L 29/06 | (2006.01) |
| H04W 12/08 | (2009.01) |

(52) U.S. Cl.
CPC ............ H04W 12/06 (2013.01); H04W 4/02 (2013.01); H04L 63/0861 (2013.01); H04W 12/08 (2013.01)

(58) Field of Classification Search
CPC .............................. H04W 12/08; H04W 88/02
USPC .... 455/411, 41.3, 410, 466, 414.1; 340/5.53
See application file for complete search history.

(56) References Cited

U.S. PATENT DOCUMENTS

| | | | |
|---|---|---|---|
| 2004/0239480 A1* | 12/2004 | Beenau | G06Q 20/00 340/5.53 |
| 2004/0239481 A1* | 12/2004 | Beenau | G06Q 20/00 340/5.53 |
| 2006/0273880 A1* | 12/2006 | Yuhara | B60R 25/255 340/5.83 |
| 2010/0180127 A1* | 7/2010 | Li | H04L 9/3231 713/186 |
| 2010/0228692 A1 | 9/2010 | Guralnik et al. | |
| 2010/0266169 A1* | 10/2010 | Abiko | G06K 9/00026 382/124 |
| 2012/0167170 A1 | 6/2012 | Shi et al. | |
| 2013/0055348 A1 | 2/2013 | Strauss et al. | |
| 2013/0091564 A1* | 4/2013 | Fitzgerald | G06F 21/88 726/17 |
| 2013/0207786 A1* | 8/2013 | Hutzler | G06K 9/00892 340/10.51 |
| 2014/0143149 A1 | 5/2014 | Aissi | |
| 2014/0223522 A1 | 8/2014 | Steeves et al. | |
| 2014/0282868 A1 | 9/2014 | Sheller et al. | |

(Continued)

OTHER PUBLICATIONS

International Search Report and Written Opinion—PCT/US2015/065577—ISA/EPO—dated Mar. 1, 2016.

*Primary Examiner* — Joseph Arevalo
(74) *Attorney, Agent, or Firm* — Hunter Clark PLLC (57) ABSTRACT

Disclosed is a mobile device to provide continuous and discrete user authentication. The mobile device may include: a contextual sensor; a soft biometric sensor; and a processor. The processor may be configured to: implement a background authentication process in a continuous manner based upon a soft biometric input from the soft biometric sensor and a contextual input from the contextual sensor; determine an anomaly event; and based upon the anomaly event, request a discrete authentication input from the user.

20 Claims, 4 Drawing Sheets

(56) References Cited

U.S. PATENT DOCUMENTS

| | | |
|---|---|---|
| 2014/0289833 A1 | 9/2014 | Briceno et al. |
| 2015/0081295 A1* | 3/2015 | Yun ...................... G10L 17/005 |
| | | 704/236 |
| 2016/0135046 A1* | 5/2016 | John Archibald .... H04W 12/06 |
| | | 455/411 |

* cited by examiner

MOBILE DEVICE TO PROVIDE CONTINUOUS AND DISCRETE USER AUTHENTICATION

BACKGROUND

Field

The present invention relates to a mobile device that provides continuous and discrete user authentication.

Relevant Background

User authentication is now commonly required to access a mobile device, such as, a smart phone, a tablet, a laptop computer, etc. Present authentication systems on mobile devices are typically only discrete in nature, where they tend to perform user authentication based upon an explicit request for an explicit authentication input. A commonly deployed discrete authentication method to authenticate a user to a mobile device is a password or a fingerprint externally inputted by the user.

Unfortunately, such commonly used systems completely ignore the temporal information stored in the device, the history of the device owner's behavior, as well as other context aware information readily available to the mobile device.

SUMMARY

Aspects of the invention may relate to a mobile device to provide continuous and discrete user authentication. The mobile device may include: a contextual sensor; a soft biometric sensor; and a processor. The processor may be configured to: implement a background authentication process in a continuous manner based upon a soft biometric input from the soft biometric sensor and a contextual input from the contextual sensor; determine an anomaly event; and based upon the anomaly event, request a discrete authentication input from the user.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "mobile device" refers to any form of programmable computer device including but not limited to laptop computers, tablets, smartphones, televisions, desktop computers, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, or any computing device or data processing apparatus.

Figure 1:
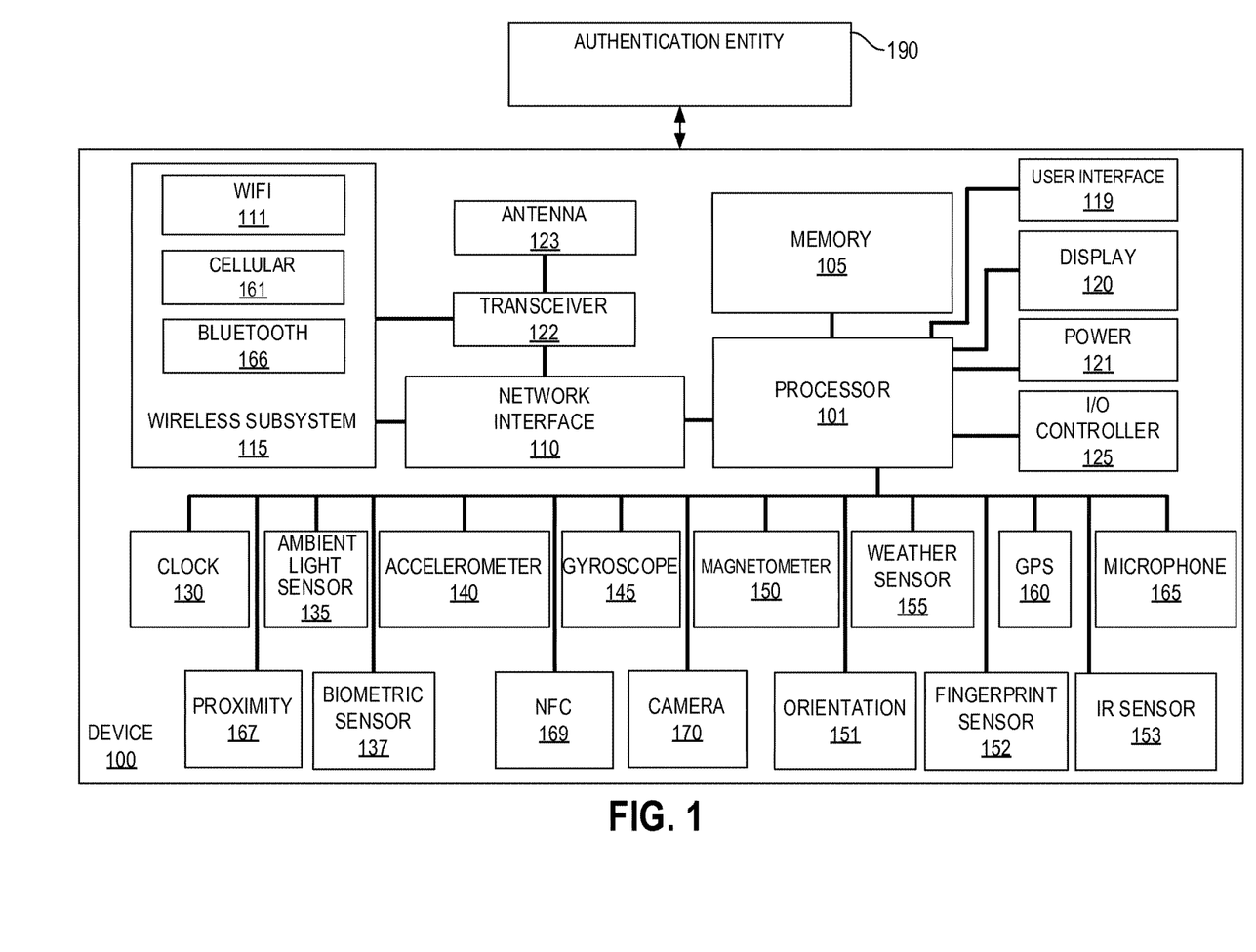
FIG. 1 is a diagram of a device in which aspects of the invention may be practiced.

FIG. 1 is block diagram illustrating an exemplary device in which embodiments of the invention may be practiced. The system may be a computing device (e.g., a mobile device 100), which may include one or more processors 101, a memory 105, I/O controller 125, and network interface 110. Mobile device 100 may also include a number of sensors coupled to one or more buses or signal lines further coupled to the processor 101. It should be appreciated that mobile device 100 may also include a display 120 (e.g., a touch screen display), a user interface 119 (e.g., keyboard, touch screen, or similar devices), a power device 121 (e.g., a battery), as well as other components typically associated with electronic devices. In some embodiments, mobile device 100 may be a transportable device, however, it should be appreciated that device 100 may be any type of computing device that is mobile or non-mobile (e.g., fixed at a particular location).

Mobile device 100 may include sensors such as: a clock 130, ambient light sensor (ALS) 135, biometric sensor 137 (e.g., blood pressure monitor, etc.), accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, proximity sensor 167, and near field communication (NFC) sensor 169. Further, sensors may include a microphone 165 and camera 170. Communication components may include a wireless subsystem 115 (Bluetooth 166, Wi-Fi 111, cellular 161), which may also be considered sensors, that are used to analyze the environment (e.g., position) of the device. In some embodiments, multiple cameras are integrated or accessible to the device. For example, a mobile device may have at least a front and rear mounted camera. In some embodiments, other sensors may also have multiple installations or versions.

Memory 105 may be coupled to processor 101 to store instructions for execution by processor 101. In some embodiments, memory 105 is non-transitory. Memory 105 may also store one or more models, modules, engines to implement embodiments described below that are implemented by processor 101. Memory 105 may also store data from integrated or external sensors.

Mobile device 100 may include one or more antenna(s) 123 and a transceiver 122. The transceiver 122 may be configured to communicate bidirectionally, via the antenna(s) and/or one or more wired or wireless links, with one or more networks, in cooperation with network interface 110 and wireless subsystems 115. Network interface 110 may be coupled to a number of wireless subsystems 115 (e.g., Bluetooth 166, Wi-Fi 111, Cellular 161, or other networks) to transmit and receive data streams through a wireless link to/from a wireless network, or may be a wired interface for direct connection to networks (e.g., the Internet, Ethernet, or other wireless systems). Mobile device 100 may include one or more local area network transceivers connected to one or more antennas. The local area network transceiver comprises suitable devices, hardware, and/or software for communicating with and/or detecting signals to/from WAPs, and/or directly with other wireless devices within a network. In one aspect, the local area network transceiver may comprise a Wi-Fi (802.11x) communication system suitable for communicating with one or more wireless access points.

Mobile device 100 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band, ZigBee, wireless USB, etc. In conventional digital cellular networks, position location capability can be provided by various time and/or phase measurement techniques. For example, in CDMA networks, one position determination approach used is Advanced Forward Link Trilateration (AFLT).

Thus, device 100 may be a: mobile device, wireless device, cellular phone, personal digital assistant, mobile computer, wearable device (e.g., head mounted display, wrist watch, virtual reality glasses, etc.), internet appliance, gaming console, digital video recorder, e-reader, robot navigation system, tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, mobile device 100 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at the device 100. Also, "mobile device" is intended to include all devices, including wireless communication devices, computers, laptops, etc., which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

It should be appreciated that embodiments of the invention as will be hereinafter described may be implemented through the execution of instructions, for example as stored in the memory 105 or other element, by processor 101 of mobile device 100 and/or other circuitry of device and/or other devices. Particularly, circuitry of the device, including but not limited to processor 101, may operate under the control of a program, routine, or the execution of instructions to execute methods or processes in accordance with embodiments of the invention. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like. The functions of each unit or module within the mobile device 100 may also be implemented, in whole or in part, with instructions embodied in a memory, formatted to be executed by one or more general or application-specific processors.

Embodiments of the invention may relate to an apparatus and method to enhance security on a biometric enabled mobile device. In particular, as will be described hereinafter, mobile device 100 having biometric authentication features, under the control of processor 101, may implement methods to provide continuous and discrete user authentication.

Various terminologies will be described to aid in the understanding of aspects of the invention. Sensor inputs may refer to any input from any of the previously described sensors, such as: clock 130, ambient light sensor (ALS) 135, biometric sensor 137 (e.g., blood pressure monitor, etc.), accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, microphone 165, proximity sensor 167, near field communication (NFC) sensor 169, camera 170, etc.

In particular, some of the sensor inputs may be referred to a biometric sensor inputs from biometric sensors, which may include: fingerprint sensor 152 (e.g., fingerprint input), touch-screen 120 (e.g., fingerprint input), touch-screen 120 (e.g., hand geometry), pressure sensors, microphone 165 (e.g., voice scan), camera 170 (facial scan), IR sensor 153 (iris scan), etc. It should be appreciated these are just example of biometric sensor inputs and biometric sensors and that a wide variety of additional sensor inputs may be utilized. For example, other biometric sensors 137 may be utilized, such as, a blood pressure sensor.

Further, contextual information or contextual inputs may refer to the current environment or current events that the mobile device 100 is currently in as monitored by "contextual sensor". Therefore, a contextual sensor may be considered to be any type of sensor that relates to the current context situation (i.e., current events) of the mobile device which may relate to such contextual sensing information as: light; acceleration; weather; orientation; location, proximity, sound, etc. Accordingly, examples of contextual sensors may include: ambient light sensor 135; accelerometer 140; weather sensor 155; orientation sensor 151; GPS 160, proximity sensor 167; microphone 165, etc. These merely being examples of context inputs and contextual sensors. Also, contextual inputs may also be characterized as data collected about the user, such as: transaction amounts during purchases, user spending data, crowd source data, demographic data, websites visited, emails, phone calls made, files opened, networks used, applications used, etc.

Embodiments of the invention may relate to an apparatus and method to enhance security on a biometric enabled mobile device 100. Embodiments of the invention may relate to a mobile device 100 that enhances security by utilizing a methodology of hybrid user authentication that includes both continuous authentication and discrete user authentication. In particular, as will be described hereinafter, mobile device 100, under the control of processor 101, may implement methods to enhance the security of the mobile device by implementing a background authentication process in a continuous manner as well as a discrete explicit user authentication requiring user input.

As previously described, mobile device 100 may include one or more biometric sensors, as well as, one or more contextual sensors. Processor 101 may be configured to: implement a background authentication process in a continuous manner based upon a soft biometric input from a soft biometric sensor and contextual input from a contextual sensor; determine an anomaly event; and, based upon the anomaly event, request a discrete explicit authentication input from a user.

In particular, an anomaly event may be determined based upon a multitude of different factors. For example, an anomaly event may occur based upon: a period of time without movement of the mobile device 100; a period of time without input to the mobile device 100; a suspicious location of the mobile device 100 based upon GPS sensor 160 input; or an unknown biometric input from an unknown user from one of the many previously described biometric sensors. For example, an unknown fingerprint from fingerprint sensor 152, an unknown facial scan from camera 170, an unknown voice from microphone 165. These are just examples. It should be appreciated that any unknown input may be a flag to an anomaly event.

As examples, soft biometric input from a soft biometric sensor may include biometric input that is received from a user implicitly. These may include a fingerprint scan from a touch-screen 120 unknown to the user, a finger geometry scan from a touch-screen 120 unknown to the user, a hand geometrical scan from a touch-screen 120 unknown to the user, a voice scan from a microphone 165 unknown to the user, a partial facial scan from a camera 170 unknown to the user, etc. In particular, as previously described, a biometric sensor may be a soft biometric sensor configured to monitor a plurality of different types of biometric inputs. As examples, these may include a touch-screen 120 (e.g., fingerprint scan, finger geometry scan, hand geometry scan, etc.), microphone 165 (e.g., voice scan), camera 170 (e.g., facial scan, hand scan, etc.). Further, biometric sensors may relate to sensors that are configured to only monitor a particular biometric input that is an explicit authentication user input, such as, fingerprint sensor 152 that is a predefined sensor to only scan fingerprints. Other biometric sensors for explicit authentication user input may include a predefined audio authentication input (e.g., personal name, password, code, business name, etc.) to a microphone 165, a full facial picture taken explicitly by the user via a camera 170.

Further, contextual sensor inputs may be inputs from a contextual sensor related to an event and/or may include at least one of current user input data, previous user input data, websites visited, emails, phone calls, demographic data, etc. As previously described, a "contextual sensor" may be considered to be any type of sensor that relates to current context situation related to events of the mobile device which may relate to such sensing information as: light; acceleration; weather; orientation; location; proximity; sound; etc. Accordingly, examples of contextual sensors may include: ambient light sensor 135; accelerometer 140; weather sensor 155; orientation sensor 151; GPS 160; proximity sensor 167; microphone 165; etc.

As previously described, an anomaly event may occur (e.g., a period of time without movement, a period of time without user input, a suspicious location, an unknown biometric input), and when such anomaly event occurs, a discrete explicit authentication input from a user may be required by the mobile device 100 to authenticate the user. These types of required explicit authentication inputs may include such items as: a fingerprint input from a fingerprint sensor 152, a predefined audio authentication input (e.g., password, code, personal name, business name, etc.) to a microphone 165, or a full facial picture input taken by the user to camera 170. If the explicit authentication input authenticates the user, then user may continue utilizing the mobile device 100. On the other hand, if the explicit authentication input from the user is not authenticated, then the processor 101 may lock the mobile device 100. In one example, if an external explicit authentication input is requested at the highest level and the user cannot be authenticated, the mobile device 100 may be locked and the GPS coordinates from the GPS sensor 160 may be transmitted to a carrier for tracking purposes.

As will be described, two types of hybrid authentication methods may be performed on the mobile device 100 including: implicit user authentication and explicit external discrete authentication. In particular, logic devices of the mobile device 100 may continuously run user authentication in the background using soft biometrics, contextual monitoring, and behavior biometrics (e.g., key stroke dynamics) which are easy to process and are readily available. Contextual information may be continuously monitored, such as, previous phone calls made, previous web sites visited, previous email address utilized, etc. This type of behavioral or contextual information may be continuously monitored in the background. However, as previously described, when the context aware logic finds an anomaly in the mobile device behavior, an explicit external discrete authentication request may be made by discrete authentication logic to the user. This may include a request for an inputted password, a fingerprint scan to a fingerprint sensor 152, an explicit vocal password or vocal code via the microphone 165, etc. Further, as part of the continuous process, it should be appreciated that it may also be possible to utilize context aware logic to occasionally sample a user's speech to authenticate the user or automatically capture the user's face or partial face shot whenever there is an anomaly in the user's swipe patterns.

Figure 2:
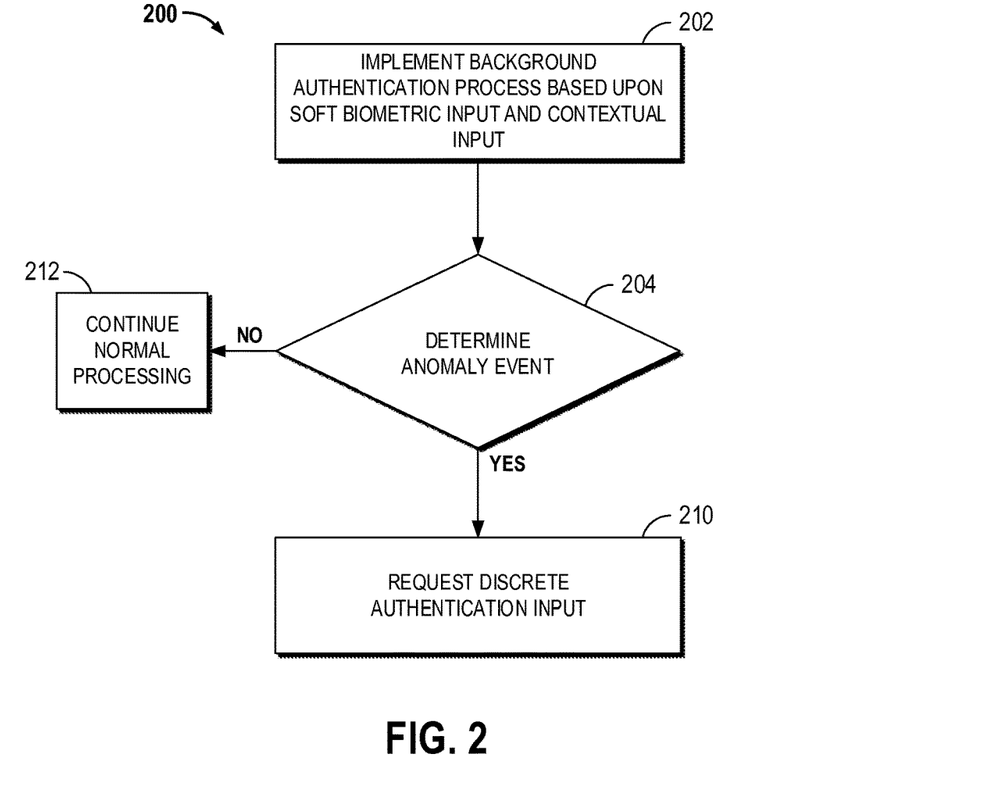
FIG. 2 is flow diagram illustrating a process to implement background authentication and determine an anomaly.

With brief additional reference to FIG. 2, a process 200 to implement hybrid continuous and discrete user authentication on a mobile device will be briefly described. In one embodiment, a background authentication process is implemented in a continuous manner based upon soft biometric input from the soft biometric sensors and contextual input from contextual sensors (block 202). At decision block 204, process 200 determines whether an anomaly event has occurred. If not, then normal processing continues (block 206). However, if an anomaly event has occurred, then a request is made to the user to provide a discrete explicit authentication user input. Examples of these explicit authentication inputs may include a fingerprint input to a fingerprint sensor 152, a predefined audio authentication input to a microphone 165, or a full facial picture input to a camera 170.

Figure 3A:
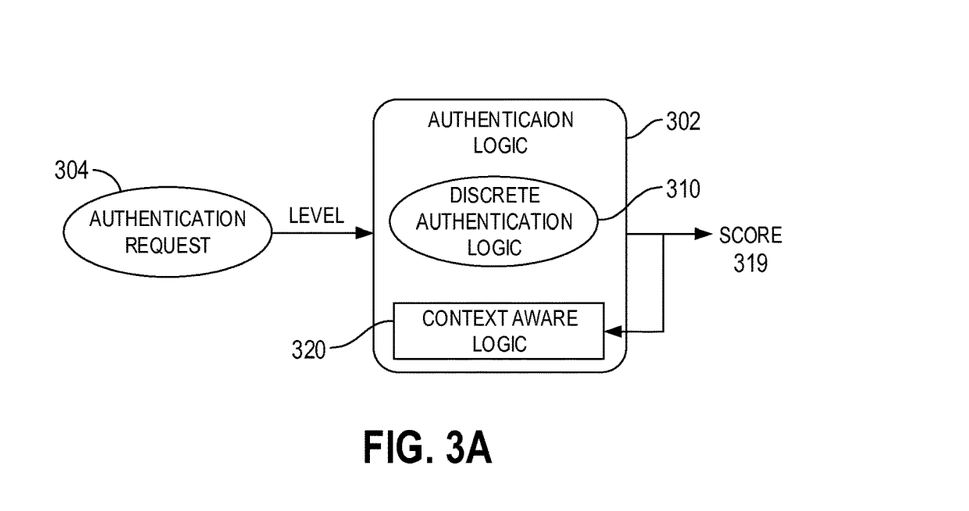
FIG. 3A is a diagram illustrating authentication logic.

With brief additional reference FIG. 3A, in one embodiment, mobile device 100 may include authentication logic 302 that includes discrete authentication logic 310 and context aware logic 320. Discrete authentication logic 310 may control the discrete explicit authentication inputs requested from a user by the mobile device, as previously described, such as, fingerprint inputs to a fingerprint sensor 152, predefined audio authentication inputs (name, password, code, etc.) to a microphone 165, a full facial picture shot taken by a user to a camera 170, etc. Similarly, context aware logic 320 may be utilized for the background authentication process in a continuous manner based upon soft biometric inputs from soft biometrics sensors and contextual inputs from contextual sensors, as previously described. Further, as shown in FIG. 3A, an authentication request 304 with an authentication level may be made. Examples of authentication levels may include: −3, −2, −1, 0, 1, 2, 3, 4, 5, etc. An authentication score 319 may be calculated based upon inputs from context aware logic 320 (e.g., based upon soft biometric and context inputs) and discrete authentication logic 302 (e.g., explicit user authentication inputs). If the score 319 exceeds the requested level (e.g., score of 5 vs. request level of 2), then authentication for the use of the mobile device or a function of the mobile device may be approved. As examples, such authentication may be to authenticate a user to access the mobile device 100 or a function of the mobile device 100 or to satisfy the level request requested by an external authentication entity 190 (e.g., a bank website, a store website, a government website) each of which may request an authentication level. On the other hand, if the score 319 does not exceed the requested level, the user may be no longer authenticated to the mobile device and/or may not be authorized to utilize a function of the mobile device and/or may not be authorized to utilize the external authentication entity 190. Also, the score 319 may be transmitted to the context aware logic 320, as will be described. Additionally, it should be appreciated that the scoring and levels previously described are merely examples, and any type of suitable scoring and levels may be utilized.

Figure 3B:
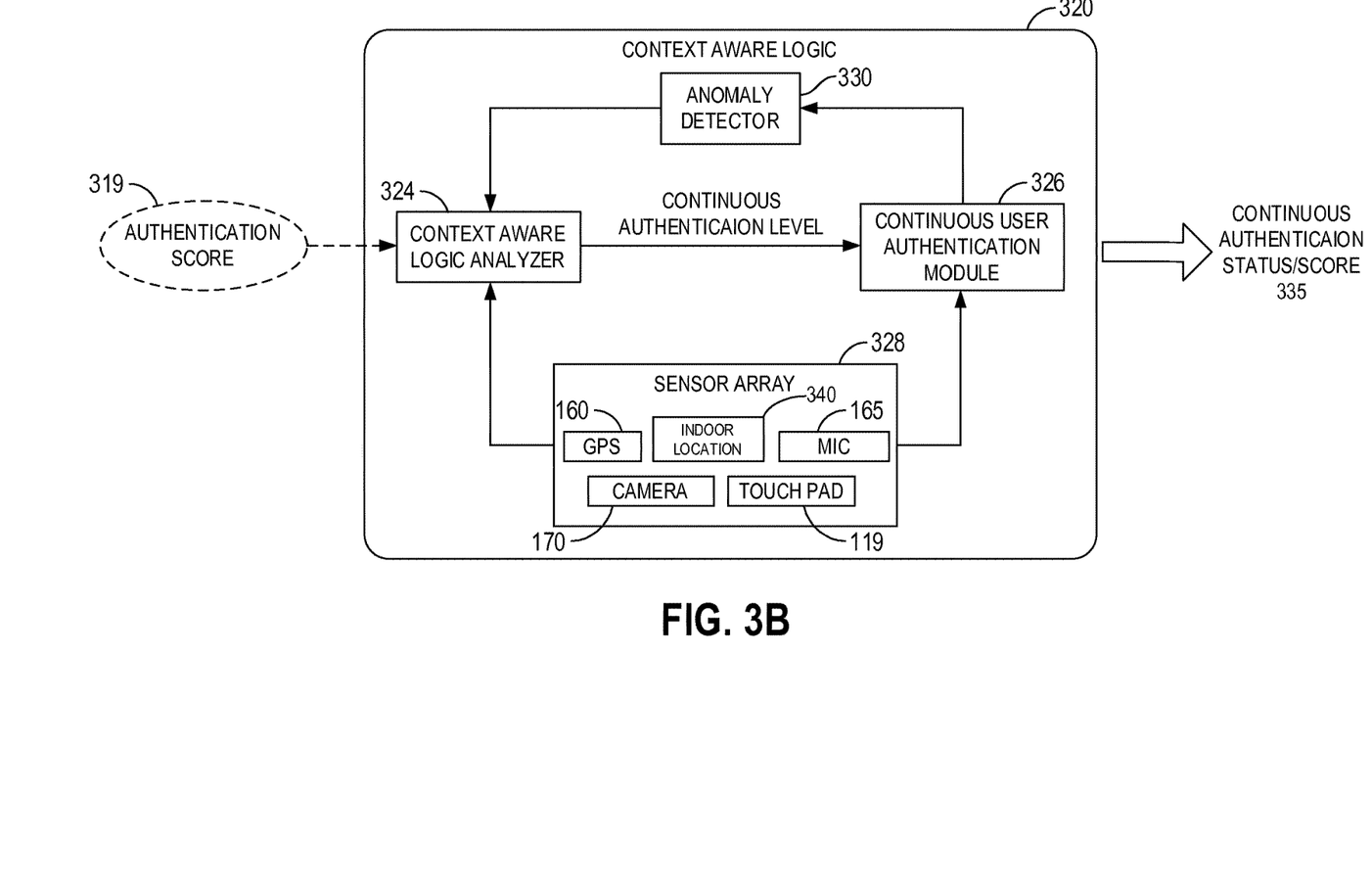
FIG. 3B is a diagram illustrating context aware logic.

With additional reference to FIG. 3B, particular aspects of context aware logic 320 will be hereinafter described. Context aware logic 320 may include: context aware logic analyzer 324, continuous user authentication module 326, sensor array 328, and anomaly detector 330. In one example, authentication score 319 may be transmitted to context aware logic analyzer 324 of the context aware logic 320. Context aware logic analyzer 324 may receive input from the sensor array 328, the anomaly detector 330, as well as the authentication score 319. Based upon the inputted authentication score 319 and the inputs from the sensor array 328, context aware logic analyzer 324 may calculate a continuous authentication level that is transmitted to the continuous user authentication module 326 to calculate a continuous authentication status or score 335, as will be described.

It should be appreciated that sensor array 328 may provide a plurality of inputs from various sensors. In particular, sensor array 328 may include soft biometric inputs from soft biometric sensors and contextual inputs from contextual sensors to both the context aware logic analyzer 324 and the continuous user authentication module 326. Examples of contextual inputs from contextual sensors includes GPS location from GPS sensor 160 and an indoor locations from indoor location sensor 340. Examples of soft biometric inputs from soft biometric sensors may include: voice scans from microphone 165; partial facial scans from camera 170; and fingerprint scans or swipes from touchpad or touchscreen 119. It should be appreciated that these are just examples and many more types of sensors may be utilized. These soft biometrics inputs and contextual inputs may be inputted to context aware logic analyzer 324 to update authentication score 319 in order to determine the continuous authentication level that is transmitted to the continuous user authentication module 326. Also, these sensors inputs from the sensor array 328 may also be inputted directly to continuous user authentication module 326. Based upon these inputs, continuous user authentication module 326 determines and transmits a continuous authentication status or score 335 to the authentication logic 302.

In this way, authentication logic 302, based upon the received continuous authentication score 335 that scores the monitored background information including soft biometric inputs and contextual inputs in combination with or without scoring from discrete authentication logic 310 based upon explicit authentication user inputs from explicit sensors, can calculate a complete authentication score 319 that may or may not match the authentication request level 304 to authenticate the user to use the mobile device, to use a function of the mobile device, or to interact with an authentication entity 190 (e.g., bank website, store website, government website, etc.).

Also, in one embodiment, context aware logic 320 may include an authentication anomaly detector 330. Anomaly detector 330 may be utilized to determine if an anomaly event has occurred. For example, an anomaly event may occur based upon such events as: a period of time without movement; a period of time without user input; a suspicious location of the mobile device based upon input from the GPS sensor 160 or the indoor location sensor 340; or an unknown biometric input from one of the soft biometric sensors of the sensor array (e.g., an unknown voice from microphone 165, an unknown facial scan from camera 170, an unknown fingerprint scan from touchpad 119, etc.). As previously described, if an anomaly event occurs, then, based upon the anomaly event, a discrete authentication input as controlled by a discrete authentication logic 302 may be required to authenticate the user. As previously described, such explicit authentication input may include a fingerprint input from a fingerprint sensor 152, a predefined audio authentication input (e.g., name, password, code, business name, etc.) to a microphone 165, or a complete facial picture input by the user to a camera 170. As one particular example, if a tablet mobile device has not been moved for more than 3 hours (e.g., a predetermined period of time) and no user input has been received in more than 3 hours, then an anomaly event may be detected by an anomaly detector 330 and an explicit authentication user input (a fingerprint scan to a fingerprint sensor) may be required.

Figure 4:
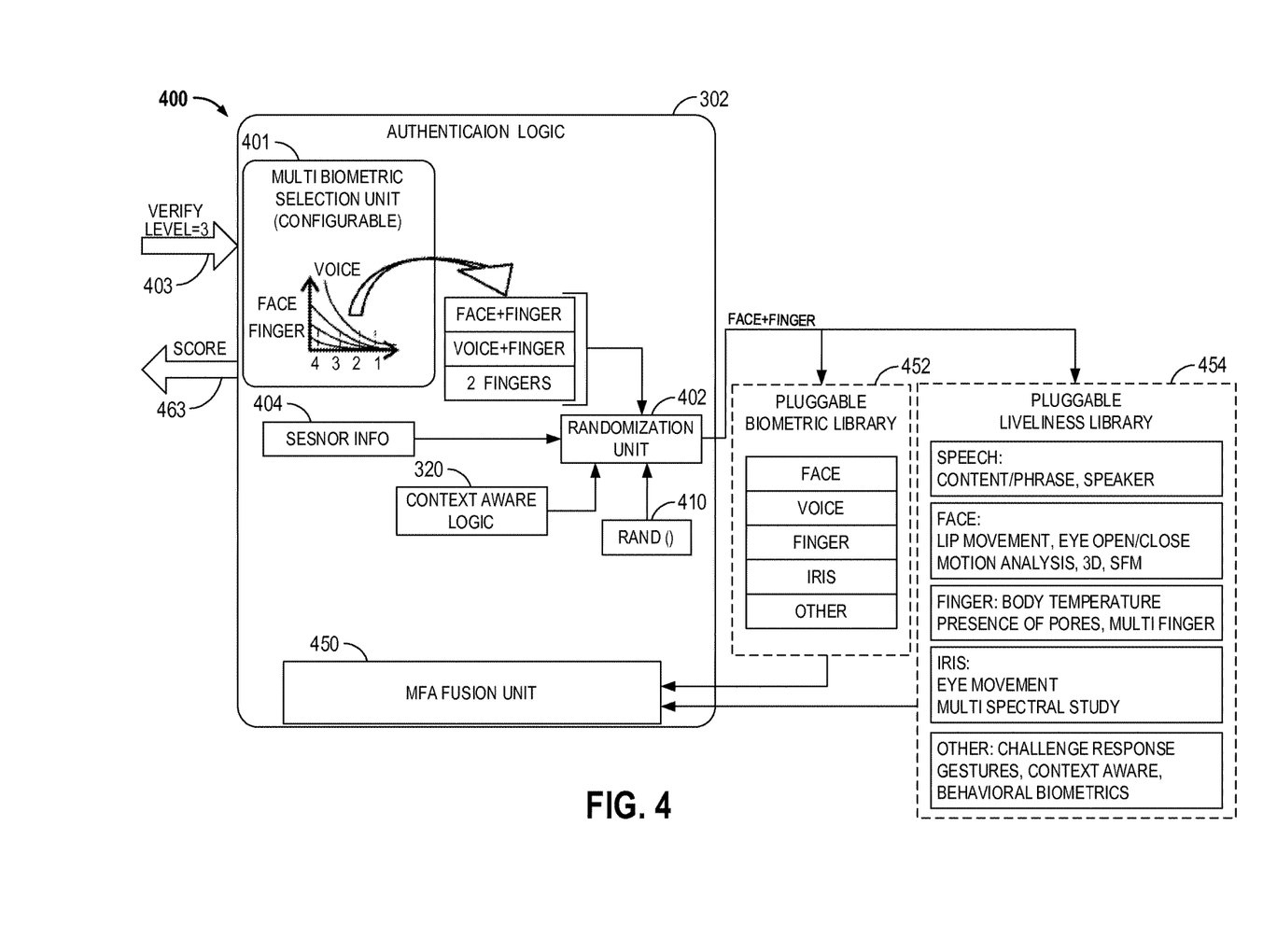
FIG. 4 is a diagram illustrating a more detailed example of authentication logic.

With additional reference to FIG. 4, a more detailed example of authentication logic 302 will be described. In this example, a randomization unit 402 in conjunction with a random number generator 410 may be utilized. Types of sensor data 401 from discrete authentication logic 302 is inputted to the randomization unit 402, along with various sensor information 404 from the previously described sensors, in combination with sensor information from the context aware logic 320 and the continuous authentication score 335. Additionally a multifactor authentication (MFA) fusion unit 450 is also utilized. In this example, the MFA fusion unit 450 may input a pluggable biometric library 452 that includes biometric templates for: face; voice; finger; iris; other components, etc.; that may be utilized for authentication purposes, as previously described. Further MFA fusion unit 450 may input a pluggable liveliness library 545 that includes such items such as: speech; face; finger; iris; other; etc.; that may be utilized to determine the liveliness of the user.

In particular, in this embodiment, authentication logic 302 utilizes randomization unit 402. In particular, randomization unit 402, based upon a random number from random number generator 410, may randomly select and require an explicit user authentication input from the discrete authentication logic 310 to ensure that the authentication score 463 matches required verification level 403. This is particularly useful in preventing spoofing operations and ensuring the security of the mobile device.

Various examples will be hereinafter described. As a first example, assuming an anomaly event has occurred, such as, the mobile device has not been moved or received user input for a pre-determined period of time (e.g. 3 hours), or the mobile device is in a suspicious location (e.g. 100 miles away from the normal home location), a verification level 403 of 3 may be set, such that the authentication score 463 must meet or exceed this verification level to ensure authentication of the user. It should be noted that various levels of authentication may correspond to various statistics. For example, as shown in the multi-biometric selection unit 401, levels 1; 2; 3; and 4 are shown. Levels may be set based upon predetermined statics. For example, level 1 may be 1 in 100 non-accuracy; level 2 may be 1 in a 1,000 non-accuracy; level 3 may be 1 in 10,000 non-accuracy; level 4 may be 1 in 100,000 non-accuracy. As can be seen in table 401, the combination of voice, face, finger has various curves in a relation to authentication level. In particular, as shown in this example table 401, a suitable level 3 verification (e.g. 1 in 10,000) may include one of: a face scan plus a finger swipe for authentication; a voice scan plus a finger swipe for authentication; or a two finger swipe for authentication.

Thus, in one example, to authenticate a user, when an anomaly event has occurred, based upon an existing context score from the context aware logic 320 covering soft biometric input scores and contextual input scores, an explicit discrete authentication input may still be required, such as verification level 3, to authenticate a user so that the user is authenticated for use with the mobile device. In this example, by utilizing randomization unit 402, a face scan and a finger swipe may be randomly selected such that a user is required to provide an explicit authentication input of a face scan and finger swipe in order to authenticate themselves to the mobile device. If authentication cannot be met, the mobile device may be locked. Further, in some embodiments, if authentication cannot be met after a predetermined number of requests, the mobile device may be locked and the location, based upon GPS sensor, may be transmitted to a carrier indicating that the mobile device may be lost or stolen. It should be appreciated that FIG. 4 is just one example of the many different types of implementation of the authentication logic utilized by embodiments of the invention.

As another example, a verification level of 3 may set for a remote authentication entity, such as bank, in which the user of the mobile device requires authentication to perform a transaction, such as paying a bill from a bank account utilizing the bank account website. Similar to the previous example, based upon an existing context score from the context aware logic 320 covering soft biometric input scores and contextual input scores, an explicit discrete authentication input may still be required, such as verification level 3, to authenticate a user so that the user is authenticated with the remote authentication entity (e.g., the bank) to perform the transaction (e.g., paying a bill from a bank account utilizing the bank account website). In this example, by utilizing randomization unit 402, a voice scan and a finger swipe may be randomly selected such that a user is required to provide an explicit authentication input of a voice scan and finger swipe in order to authenticate themselves to the bank to perform the transaction. If authentication cannot be met, the transaction will not be allowed.

It should be appreciated that a benefit of the previously described system may be the ability to quickly authenticate a user for an external authentication request (e.g., the previous bank transaction), in which, already existing continuous authentication evidence already exists (producing an already high continuous authentication score 335 to meet high verification level (e.g., 3)) to quickly confirm a bank transaction without the need for additional external explicit authentication input. For example, if the user has already made a first bank transaction, and then wishes to make another within a predefined period of time (e.g. 10 minutes), and the context aware logic 320 verifies that the user is in the same location, then a high continuous authentication score 335 to meet a high verification level of 3 may already exist, and additional external explicit authentication input (e.g., a voice scan and finger swipe) from the user may not be required.

As another example, if the context aware logic 320 includes clear evidence from its continuous background authentication process including soft biometric inputs from soft biometric sensors and contextual inputs from contextual sensors (e.g., location based upon GPS sensor 160, series of same phone calls, emails, and websites visited, and touch pad 119 indicating common finger swipes), and therefore a high continuous authentication score 335 to meet a required verification level (e.g., 3) already exists, the user can be authenticated to make a purchase (e.g. a low cost coffee purchase) to an authentication entity (e.g., a coffee shop wireless billing system) without any required explicit authentication input. In this way, the user experience is improved.

As another example, if a user wishes to unlock a garage door, context aware logic 320 may analyze the stored history of the users GPS location and may ask for an authentication input to unlock the garage door based upon whether the anomaly detector 330 has detected an anomaly. For example, if the user has come from a previously unknown location to the garage door, such that an anomaly event has occurred, a more trusted explicit user input may be requested such as a facial scan and a fingerprint. On the other hand, if the context aware logic 320 does not determine any anomalies, e.g., the GPS location indicates a location setting from work to home, a far less intrusive explicit authentication input may be requested, such as, the 4-digit password may be requested.

Therefore, context aware logic 320 may continuously perform a background authentication process based upon soft biometric inputs from soft biometric sensors and contextual inputs from contextual sensors to determine whether or not an explicit discrete authentication input is required from a user and which type of explicit authentication input may be required from a user. Also, if the explicit authentication input does not authenticate the user, then the mobile device may be locked and/or the GPS location of the mobile device transmitted to a carrier.

It should be appreciated that these are merely examples of the previously described embodiments. It should be appreciated that aspects of the invention previously described may be implemented in conjunction with the execution of instructions by processors of the devices, as previously described. Particularly, circuitry of the devices, including but not limited to processors, may operate under the control of a program, routine, or the execution of instructions to execute methods, modules, or processes in accordance with embodiments of the invention. For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other suitable device. These devices may have different power and data requirements Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device comprising:
   a contextual sensor; and
   a processor configured to:
   implement a background authentication process in a continuous manner based upon a soft biometric input from a biometric sensor and a contextual input from the contextual sensor, wherein the soft biometric input from the biometric sensor includes biometric input received from a user implicitly, wherein the soft biometric sensor is configured to scan one or more physical attributes of the user without alerting the user that the scan is being performed;
   determine an anomaly event based on the soft biometric input;
   based upon the anomaly event, request a discrete authentication input comprising an explicit audio authentication input from the user that meets or exceeds a verification level determined based on the anomaly event;
   authenticating the user using the discrete authentication input; and
   locking the mobile device responsive to the discrete authentication input failing to authenticate the user.

2. The mobile device of claim 1, wherein, the anomaly event is at least one of a period of time without movement or input for the mobile device, a suspicious location of the mobile device, or an unknown biometric input.

3. The mobile device of claim 1, wherein, the contextual sensor input includes at least one of location, movement, or user input data.

4. The mobile device of claim 1, wherein, the explicit authentication input comprises at least one of a fingerprint input to a fingerprint sensor, a predefined audio authentication input to a microphone, or a facial picture input to a camera.

5. The mobile device of claim 1, wherein, the discrete authentication input requested is selected randomly.

6. The method of claim 1, wherein the biometric sensor is configured to perform a geometry scan of one or more fingers, a hand, or both of the user using a touchscreen of the mobile device without alerting the user that the geometry scan is being performed.

7. A method comprising:
   implementing with a mobile device a background authentication process in a continuous manner based upon a soft biometric input from a biometric sensor and a contextual input from a contextual sensor, wherein the soft biometric input from the biometric sensor includes biometric input received from a user implicitly, wherein the soft biometric sensor is configured to scan one or more physical attributes of the user without alerting the user that the scan is being performed;
   determining an anomaly event based on the soft biometric input;
   based upon the anomaly event, requesting a discrete authentication input comprising an explicit audio authentication input from the user that meets or exceeds a verification level determined based on the anomaly event;
   authenticating the user using the discrete authentication input; and
   locking the mobile device responsive to the discrete authentication input failing to authenticate the user.

8. The method of claim 7, wherein, the anomaly event is at least one of a period of time without movement or input for the mobile device, a suspicious location of the mobile device, or an unknown biometric input.

9. The method of claim 7, wherein, the contextual sensor input includes at least one of location, movement, or user input data.

10. The method of claim 7, wherein, the explicit authentication input comprises at least one of a fingerprint input to a fingerprint sensor, a predefined audio authentication input to a microphone, or a facial picture input to a camera.

11. The method of claim 7, wherein, the discrete authentication input requested is selected randomly.

12. A non-transitory computer-readable medium including code that, when executed by a processor, causes the processor of a mobile device to:
   implement a background authentication process in a continuous manner based upon a soft biometric input from a biometric sensor and a contextual input from a contextual sensor, wherein the soft biometric input from the biometric sensor includes biometric input received from a user implicitly, wherein the soft biometric sensor is configured to scan one or more physical attributes of the user without alerting the user that the scan is being performed;
   determine an anomaly event based on the soft biometric input;
   based upon the anomaly event, request a discrete authentication input comprising an explicit audio authentication input from the user that meets or exceeds a verification level determined based on the anomaly event;
   authenticate the user using the discrete authentication input; and
   locking the mobile device responsive to the discrete authentication input failing to authenticate the user.

13. The computer-readable medium of claim 12, wherein, the anomaly event is at least one of a period of time without movement or input for the mobile device, a suspicious location of the mobile device, or an unknown biometric input.

14. The computer-readable medium of claim 12, wherein, the contextual sensor input includes at least one of location, movement, or user input data.

15. The computer-readable medium of claim 12, wherein, the explicit authentication input comprises at least one of a fingerprint input to a fingerprint sensor, a predefined audio authentication input to a microphone, or a facial picture input to a camera.

16. The computer-readable medium of claim 12, further comprising code to randomly select the discrete authentication input requested.

17. A mobile device comprising:
   means for implementing a background authentication process in a continuous manner based upon a soft biometric input from a biometric sensor and a contextual input from a contextual sensor, wherein the soft biometric input from the biometric sensor includes biometric input received from a user implicitly, wherein the soft biometric sensor is configured to scan one or more physical attributes of the user without alerting the user that the scan is being performed;
   means for determining an anomaly event based on the soft biometric input;
   means for requesting a discrete authentication input comprising an explicit audio authentication input from the user based upon the anomaly event, wherein the authentication input requested meets or exceeds a verification level determined based on the anomaly event;

means for authenticating the user using the discrete authentication input; and means for locking the mobile device responsive to the discrete authentication input failing to authenticate the user.

18. The mobile device of claim 17, wherein, the anomaly event is at least one of a period of time without movement or input for the mobile device, a suspicious location of the mobile device, or an unknown biometric input.

19. The mobile device of claim 17, wherein, the contextual sensor input includes at least one of location, movement, or user input data.

20. The mobile device of claim 17, wherein, the explicit authentication input comprises at least one of a fingerprint input to a fingerprint sensor, a predefined audio authentication input to a microphone, or a facial picture input to a camera.

* * * * *